Dec. 11, 1951     C. A. STEVENS     2,578,609
CROP PICKUP AND FEEDING IMPLEMENT

Filed Aug. 17, 1945     4 Sheets-Sheet 1

INVENTOR.
Clarence A. Stevens
BY
ATTORNEY

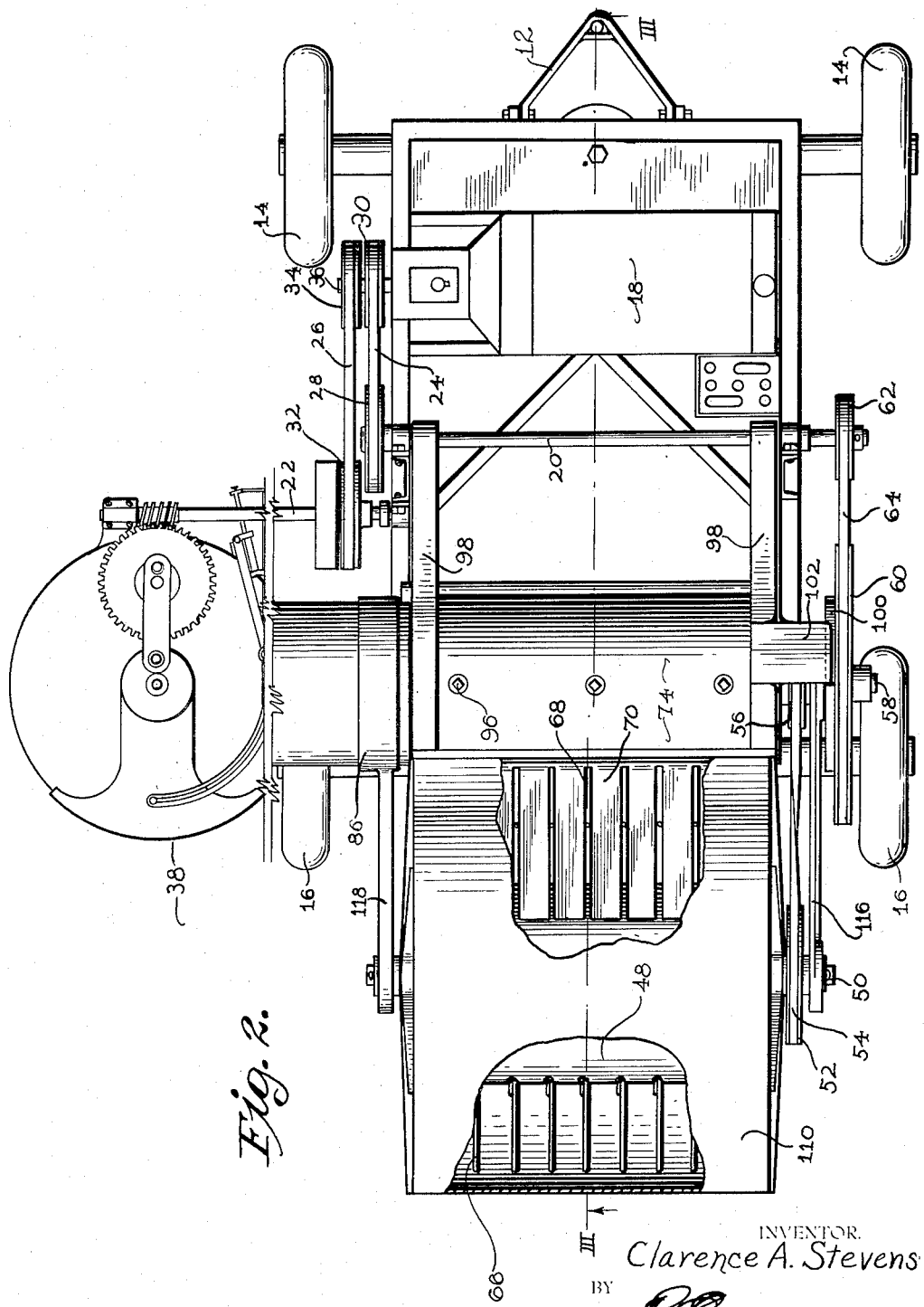

Dec. 11, 1951 C. A. STEVENS 2,578,609
CROP PICKUP AND FEEDING IMPLEMENT
Filed Aug. 17, 1945 4 Sheets-Sheet 3
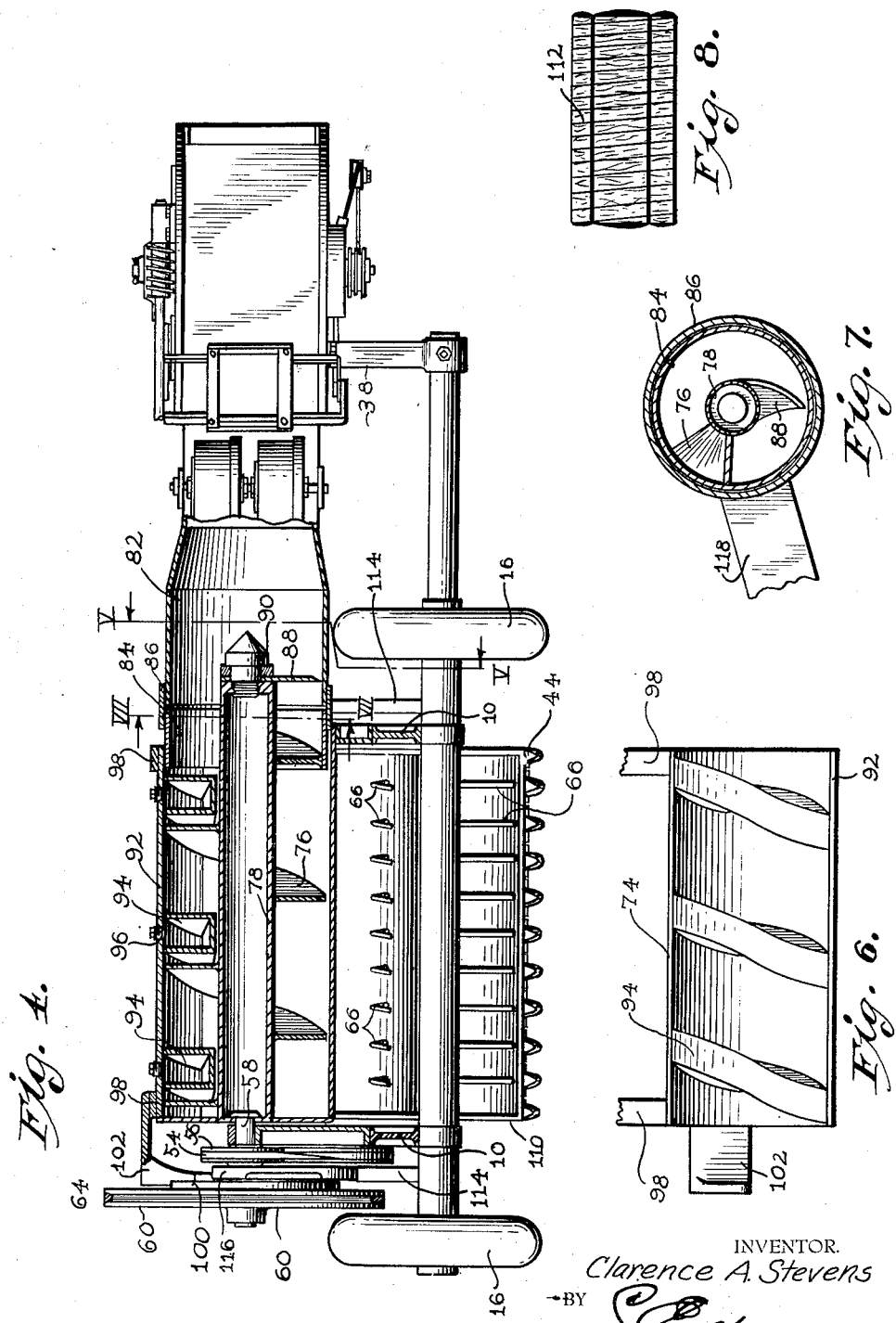
INVENTOR.
Clarence A. Stevens
BY
ATTORNEY Dec. 11, 1951        C. A. STEVENS        2,578,609
CROP PICKUP AND FEEDING IMPLEMENT
Filed Aug. 17, 1945        4 Sheets-Sheet 4
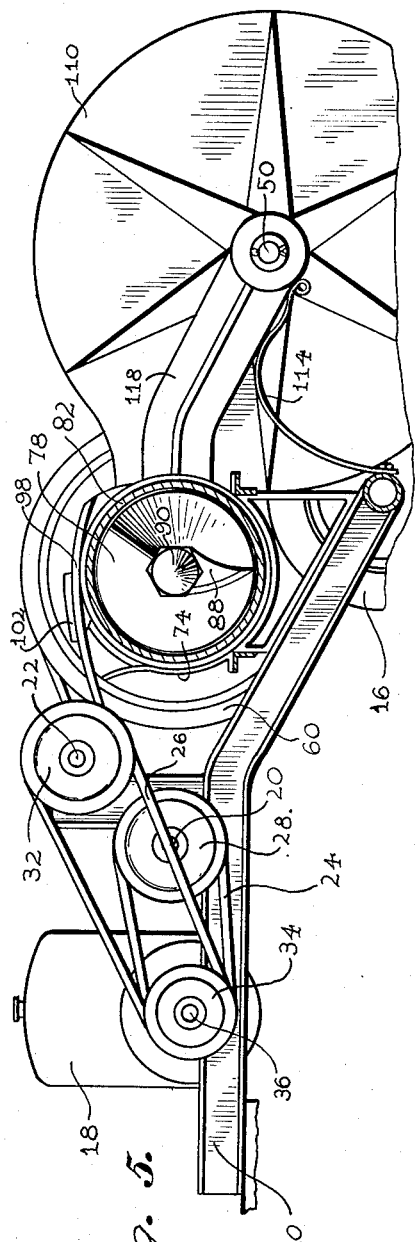
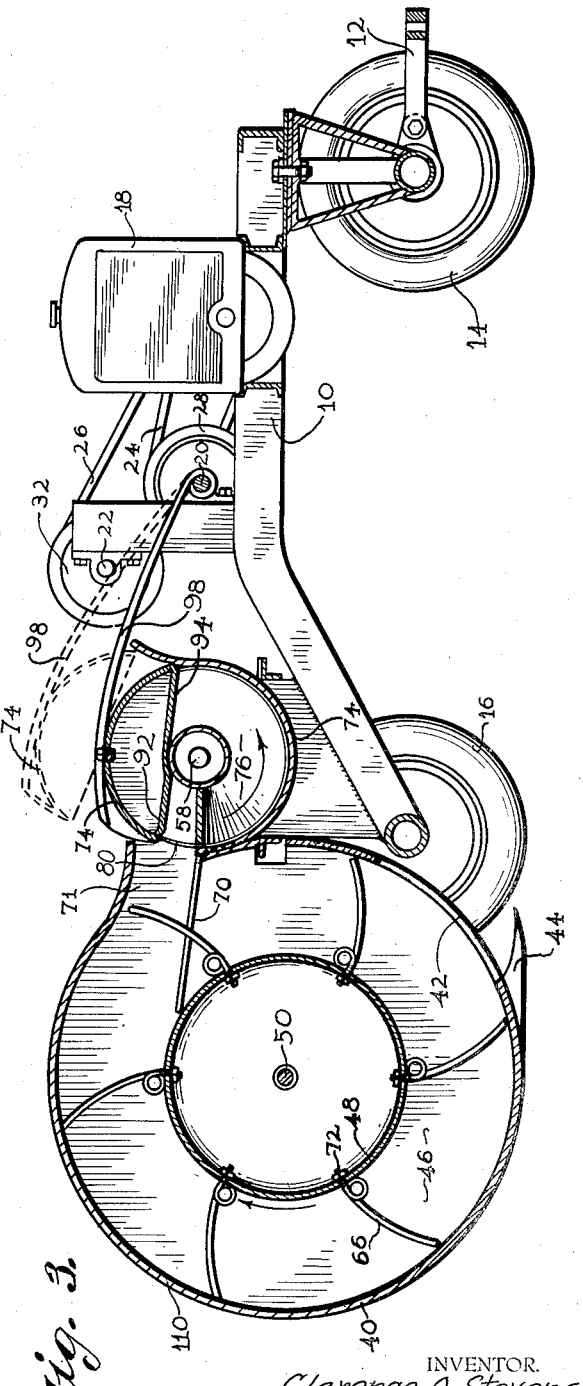
INVENTOR.
*Clarence A. Stevens*
BY
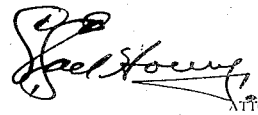
ATTORNEY Patented Dec. 11, 1951

2,578,609

UNITED STATES PATENT OFFICE 2,578,609

CROP PICKUP AND FEEDING IMPLEMENT

Clarence A. Stevens, Wichita, Kans.

Application August 17, 1945, Serial No. 611,120

4 Claims. (Cl. 100—13)

This invention relates to machines for handling crops and particularly cut grasses and parts of grasses from which the berries have been removed, and has for its primary aim to provide an implement capable of quickly, effectively and positively baling said grasses and grain stems.

One of the important objects of my invention is to provide a cut crop handling implement of the aforementioned character that will receive the material from any desired location; feed the same into a specially formed packing and conveying structure, which in turn introduces the crop into a baler forming a part of the machine.

This invention has for other aims to provide a cut crop handling implement that is capable of collecting the material to be baled directly from windrows on the ground; feeding the same into a packing and conveying structure where it is compressed by a cooperating part of the equipment; and then forming the material into an endless, spiral strip as it leaves the conveying structure for introduction into the baler made pursuant to my invention but more specifically disclosed in an application filed on even date herewith and bearing Serial No. 611,119.

Other objects of the invention of an important nature include the specific details of structure embodied in the pick-up apparatus forming a part of the implement; the unique parts comprising the packing and conveying structure; and the manner of associating the said apparatus and structure for handling a cut crop immediately prior to its introduction to a baler and to the end that the form of said crop is desirable from the standpoint of using the baled material as it reaches its point of consumption.

One form of the invention has been chosen for illustration and is shown in the accompanying drawings, wherein:

Fig. 2 is a top plan view thereof, with portions broken away for clearness.

Fig. 3 is a longitudinal cross sectional view taken on line III—III of Fig. 2.

Fig. 4 is a vertical transverse sectional view taken on line IV—IV of Fig. 1.

Fig. 5 is a fragmentary sectional view taken on line V—V of Fig. 4, and looking in the direction of the arrows.

Fig. 6 is an inverted plan view of the compressing beater entirely removed from association with the remaining parts of the implement.

Fig. 7 is a fragmentary sectional view taken on line VII—VII of Fig. 4 and looking in the direction of the arrows; and Fig. 8 is a side elevational view of a bale formed from cut crops that have passed through the implement.

Figure 1:
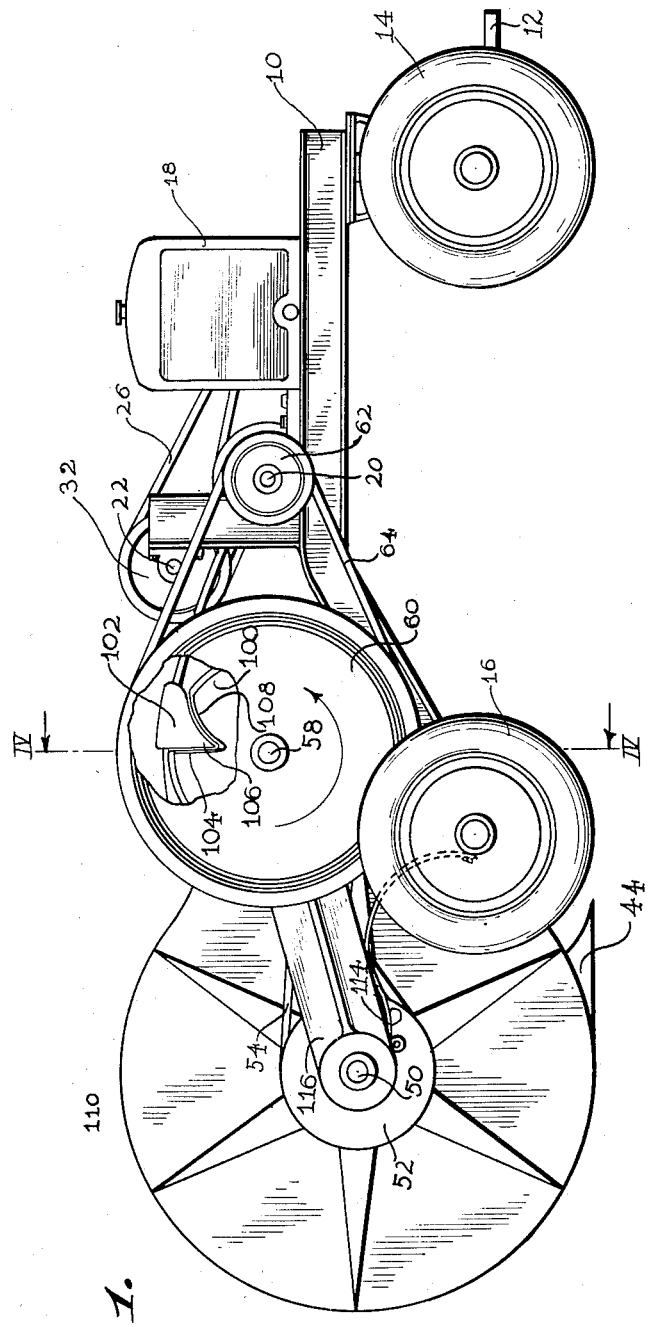
Fig. 1 is a side elevational view of the crop pickup and feeding implement made pursuant to the present invention.

While an implement of the character embodying my invention may be automotive in character, it is desirable to pull the same through the use of a tractor or the like, that is coupled to frame 10 by a connection such as 12. In many instances, the baling and crop handling implement will be attached directly behind a combine where the straw or stream of the grain being cut and thrashed, will be collected and baled immediately after the threshing operation.

The frame portion of the implement which has been generally designated by the numeral 10, is extensive enough to support all of the component parts and is mounted upon a pair of forward wheels 14 and a pair of rear wheels 16, the size and gauge of which may suit conditions and the capacity of the implement desired.

An engine 18 of the internal combustion type, serves as a prime mover for the component parts of the implement and is joined to shafts 20 and 22 respectively by belts 24 and 26 that pass over pulleys 28 and 30 for belt 24, and 32 and 34 for belt 26. Pulleys 30 and 34 are mounted upon drive shaft 36 of engine 18 and pulleys 28 and 32 are mounted upon shafts 20 and 22 respectively.

This latter mentioned shaft 22 is part of the driving mechanism for a baler 38, none of the details whereof will be hereinafter set down, but the location of which is as shown in Figs. 2 and 4. It is to this baler 38 that the cut crop is fed after passing through the pick-up apparatus and packing and conveying structure, about to be described in detail. The said baler 38 forms the subject matter of said co-pending application, Serial No. 611,119 and filed on even date herewith.

The implement illustrated is desired for collecting a cut crop from the ground as the machine is moved forwardly through force applied at connection 12. Engine 18 is operating independently of any forward speed that is imparted to the implement, and, therefore, the timing and actuation of the movable parts are entirely separate from the forward speed and rotation of wheels 14 and 16.

*Pick-up and feeding apparatus*

That part of the implement into which the cut crop is first introduced, is shown to the left as Fig. 3 is viewed. The said apparatus comprises a stationary, substantially cylindrical housing 40 having an intake opening 42 formed through the annular side wall at the lower portion thereof, and adjacent to the surface of the ground over which the implement is being drawn. Forwardly extending fingers 44 are in spaced apart relation, as shown in Fig. 4, and serve to prevent accidental over-riding of housing 40 when the cut crop is being collected from the surface of the ground or from windows thereof.

This intake opening communicates with an annular way 46 formed between the annular wall of pick-up housing 40 and an inner annular core 48 rotatably supported upon shaft 50 journalled in the ends of housing 40 and having a pulley 52 over which a belt 54 is disposed for the purpose of motivating core 48 in the direction of the arrow shown in Fig. 3. This endless belt 54 passes over another pulley 56 mounted on shaft 58, later to be described, but which forms a part of the packing and conveying structure of the implement. Power from engine 18 reaches core 48 however, through this said belt 54, the pulleys 52 and 56 and pulleys 60 and 62 mounted on shafts 58 and 20 respectively, and around which belt 64 is caused to pass, as clearly shown in Figs. 2 and 4.

A plurality of resilient pick-up fingers 66 are attached at one end to core 48 to extend radially outwardly into pick-up housing 40 and transversely across the annular way from between the arcuate, substantially annular wall of pick-up housing 40 and the cylindrical wall of core 48.

These fingers 66 are arranged in series, and each series thereof comprises a number of spaced apart fingers, each of which passes through a slot 68 formed in the slotted deflecting shelf 70. This shelf is positioned as shown in Fig. 3, and forms a part of a discharge opening 71 near the top of pick-up housing 40. Any material that enters intake opening 42, therefore, is forced upwardly along annular way 46 by fingers 66 and thence out through discharge opening 71 as the fingers move downwardly through slots 68 of deflector 70.

Each finger 66 is resilient enough to avoid destruction in the event a solid article is encountered and the form of the fingers is as shown in Fig. 3. The fingers are individually attached to core 48 through the medium of a nut 72 and replacement of the fingers is thereby rendered expedient.

Packing and conveying structure

As the cut crop progresses through the implement, it leaves the pick-up apparatus just described and enters a substantially cylindrical case 74 wherein the helix 76 is mounted upon shaft 58 for rotation. This shaft 58 has been previously described as supporting pulley 60, and since the said shaft extends but a short distance into case 74, reference to Fig. 4 will teach the manner in which helix 76 is carried by tube 78.

An intake port 80 formed in the side of case 74 is substantially coextensive with the length of this case and is in register with discharge opening 71 in housing 40. Helix 76 is extended to chute 82 in communication with baler 38 and the material is fed into this chute as helix 76 is rotated through power applied thereto by belt 64.

Intake port 80 of case 74 is continued across the top of this said case to allow the compressing and beating means to function in a manner hereinafter set forth.

Helix 76 has a collar 84 at the end thereof opposite to shaft 58 and this collar is journalled in a sleeve 86 mounted upon chute 82. Thus, helix 76 is maintained in a central position within case 74 and the operation of the specially formed knife will be as more distinctly described at a later point in the specification. This knife 88 extends radially from one side of tube 78 and is held in place by a machine screw 90, the removal whereof allows removal of knife 88 for sharpening or replacement.

Compressing means

As the cut material is packed and conveyed toward baler 38, it is prevented from lateral or outward radial movement by the special compressing beater 92. This beater has a number of hollow salients 94 contoured as illustrated in Figs. 3, 4 and 6, to enter between the convolutions of helix 76 when beater 92 is in the position illustrated in Figs. 3 and 4.

Filler plugs 96 communicate with hollow salients 94 to the end that substance may be introduced thereinto to increase the weight of beater 92 and thereby add to the effectiveness when the beater is moved inwardly through the action of gravity.

Beater 92 includes a pair of arms 98 one end whereof is attached by welding or otherwise, to the top of beater 92, while the outer or free ends thereof are carried by shaft 20. The attachment between arms 98 and shaft 20 is such as to allow free oscillation of the entire beater assembly and such oscillation is caused by the cam 100 formed on the inner face on the hub of pulley 60. The effective portion of this cam 100 is clearly illustrated in Fig. 1.

A shoe 102 rides over the face of cam 100 and when the radial edge 104 of cam 100 is reached by the tip 106 of shoe 102, the entire beater 92 will quickly fall toward the center of helix 76 and move hollow salients 94 into the positions shown in Fig. 4. Obviously, if cut material is within case 74 and between the convolutions of helix 76, these salients 94 will not approach tube 78, as closely as shown in this said Fig. 4.

As pulley 60 continues to rotate in the direction of the arrow, shoe 102 will ride out over the arcuate face 108 of cam 100 and raise beater 92 to a point where salients 94 will not interfere with the movement of helix 76. The rotation of helix 76 and the oscillation of beater 92 must be in timed relation for no interference between these parts to occur, under penalty of having destructive results. It has been found in practice that helix 76 should be rotated approximately 60 R. P. M. and the compressing and beating means should be elevated an equal number of times per minute.

Operation

The cut crop is fed into housing 40 through intake opening 42, or if desired, through an opening provided by removing a section 110 of housing 40 to present a top opening into which the crop may be fed or dropped in any suitable fashion from other farm implements.

Regardless of the manner in which the crop is introduced into housing 40, it is carried to discharge opening 71 by fingers 66 and thence into case 74 through intake port 80. This intake port and discharge opening 80 and 71 respectively, are coextensive in length and are substantially the same length as helix 76. Therefore, all cut material that is introduced into case 74, is projected laterally toward the axis of rotation of helix 76, where the helix actuates the substance toward discharge chute 82 and thence into baler 38.

As helix 76 continuously rotates, the material is compacted and transported toward chute 82 and the compressing and beating means 92 is periodically brought into position against the material to cooperate with helix 76 in establishing a compact, continuous, spiral strip that enters chute 82 to form a bale 112 having physical characteristics substantially as illustrated in Fig. 8. Knife 88 will react upon the cut crop as it leaves case 74 and enters chute 82, and since this knife 88 extends to one side only of the axis of rotation of helix 76, it will allow the passage of some material while it is cutting other. A continuous feed which is thereby created, will be maintained so long as the crop is introduced.

If the implement is gathering grasses or parts of grain from windrows along the ground, teeth 44 will serve as gathering means and the housing 40 will be balanced in place against too much drag by springs 114, one of which is disposed at each end of housing 40.

Irregularities in the surface over which the implement is riding are negotiated by housing 40 because this housing is movable to a slight degree about the axis of shaft 58 and case 74 due to the arrangement of arms 116 and 118 respectively. In the case of the former, one end is secured for free rotative movement upon shaft 58, while the outer end is secured to shaft 50 as clearly shown in Fig. 1. Arm 118 journals shaft 50 and the inner end of this arm 118 is secured to sleeve 86.

Those skilled in the art will readily recognize the advantages arising from a crop handling implement made pursuant to the invention as set down in the foregoing specification. It will also be manifest that implements other than those detailed in the above description, may be made to present forms other than those illustrated without departing from the spirit of the invention or scope of the appended claims.

Having thus described the invention, what is claimed as new and desired to be secured by Letters Patent is:

1. In a cut crop handling implement of the character described, having a baler forming a part thereof, packing and conveying structure for introducing the crop into the baler comprising a helix; a case for the helix, formed to confine the crop between the convolutions of the helix; apparatus for feeding the cut crop laterally into the said helix; and means for compressing the crop toward the axis of the helix as the crop is being conveyed thereby toward the said baler, said compressing means having salients contoured to enter between the convolutions of the helix, said salients being hollow and having filling openings permitting the introduction of weight-imparting substance thereinto.

2. In a cut crop handling implement of the character described, having a baler forming a part thereof, packing and conveying structure for introducing the crop into the baler comprising a helix; a case for the helix, formed to confine the crop between the convolutions of the helix; apparatus for feeding the cut crop laterally into the said helix; and means for compressing the crop toward the axis of the helix as the crop is being conveyed thereby toward the said baler, said compressing means having salients contoured to enter between the convolutions of the helix, said salients being hollow and having filling openings permitting the introduction of weight-imparting substance thereinto, the said compressing means having parts for lifting the same from a place where the salients are between the convolutions of the helix and for releasing the said means to allow the action of gravity to return the said means toward the crop contained within the packing and conveying structure.

3. In a cut crop handling implement, a hollow housing having an inlet opening formed therein for said crop; a helix mounted in said housing for rotation on a substantially horizontal axis; and means for compressing the crop toward the axis of the helix as the crop is conveyed thereby toward one end of the helix, said compressing means having salients contoured to enter between the convolutions of the helix, said salients being hollow and having filling openings permitting the introduction of weight-imparting substances therein.

4. In a cut crop handling implement, a hollow housing having an inlet opening formed therein for said crop; a helix mounted in said housing for rotation on a substantially horizontal axis; and means for compressing the crop toward the axis of the helix as the crop is conveyed thereby toward one end of the helix, said compressing means having salients contoured to enter between the convolutions of the helix, said salients being hollow and having filling openings permitting the introduction of weight-imparting substances therein, the said compressing means having parts for lifting the same from a place where the salients are between the convolutions of the helix and for releasing the said means to allow the action of gravity to return said means toward the crop contained within the said housing.

CLARENCE A. STEVENS.

REFERENCES CITED

The following references are of record in the file of this patent:

UNITED STATES PATENTS

| Number | Name | Date |
|---|---|---|
| 643,386 | Smith | Feb. 13, 1900 |
| 783,559 | Wheelwright | Feb. 28, 1905 |
| 1,049,834 | Fiddyment | Jan. 7, 1913 |
| 1,102,301 | Sizer | July 7, 1914 |
| 1,847,399 | Innes | Mar. 1, 1932 |
| 1,919,896 | MacGregor | July 25, 1933 |
| 2,179,937 | Lamp | Nov. 14, 1939 |
| 2,324,261 | Krause | July 13, 1943 |
| 2,362,402 | Reiter | Nov. 7, 1944 |
| 2,378,107 | Russell | June 12, 1945 |
| 2,430,734 | Raney | Nov. 11, 1947 |
| 2,431,828 | Raney | Dec. 2, 1947 |
| 2,446,878 | Kaupke | Aug. 10, 1948 |